United States Patent [19]

Kauneckas

[11] 3,968,505

[45] July 6, 1976

[54] DATA RECORDING SYSTEM FOR AUTOMATIC CAMERAS

[76] Inventor: John J. Kauneckas, 2301 E St. NW., Apt. A806, Washington, D.C. 20037

[22] Filed: Jan. 14, 1975

[21] Appl. No.: 540,835

[52] U.S. Cl. .............................................. 354/106
[51] Int. Cl.² .................................... G03B 17/24
[58] Field of Search .......... 354/105, 106, 107, 108, 354/109; 355/40

[56] References Cited
UNITED STATES PATENTS

| 2,987,976 | 6/1961 | Martin | 354/109 |
| 3,827,070 | 7/1974 | Hoerenz | 354/105 |

FOREIGN PATENTS OR APPLICATIONS

| 672,033 | 2/1939 | Germany | 354/105 |

Primary Examiner—John Gonzales
Attorney, Agent, or Firm—Oblon, Fisher, Spivak, McClelland & Maier

[57] ABSTRACT

A system is disclosed for recording on photographic film electronically controlled settings of automatic cameras, such as aperture and shutter speed settings. The system can be used with all types of cameras, whether shutter priority, aperture priority, or simple cameras and provides a direct indication on an edge portion of each negative of the precise shutter and aperture settings used to achieve a particular photographic effect. The system uses one or more light emitting diode displays driven through analog-to-digital converters by the electronic control circuitry of an automatic camera.

9 Claims, 2 Drawing Figures

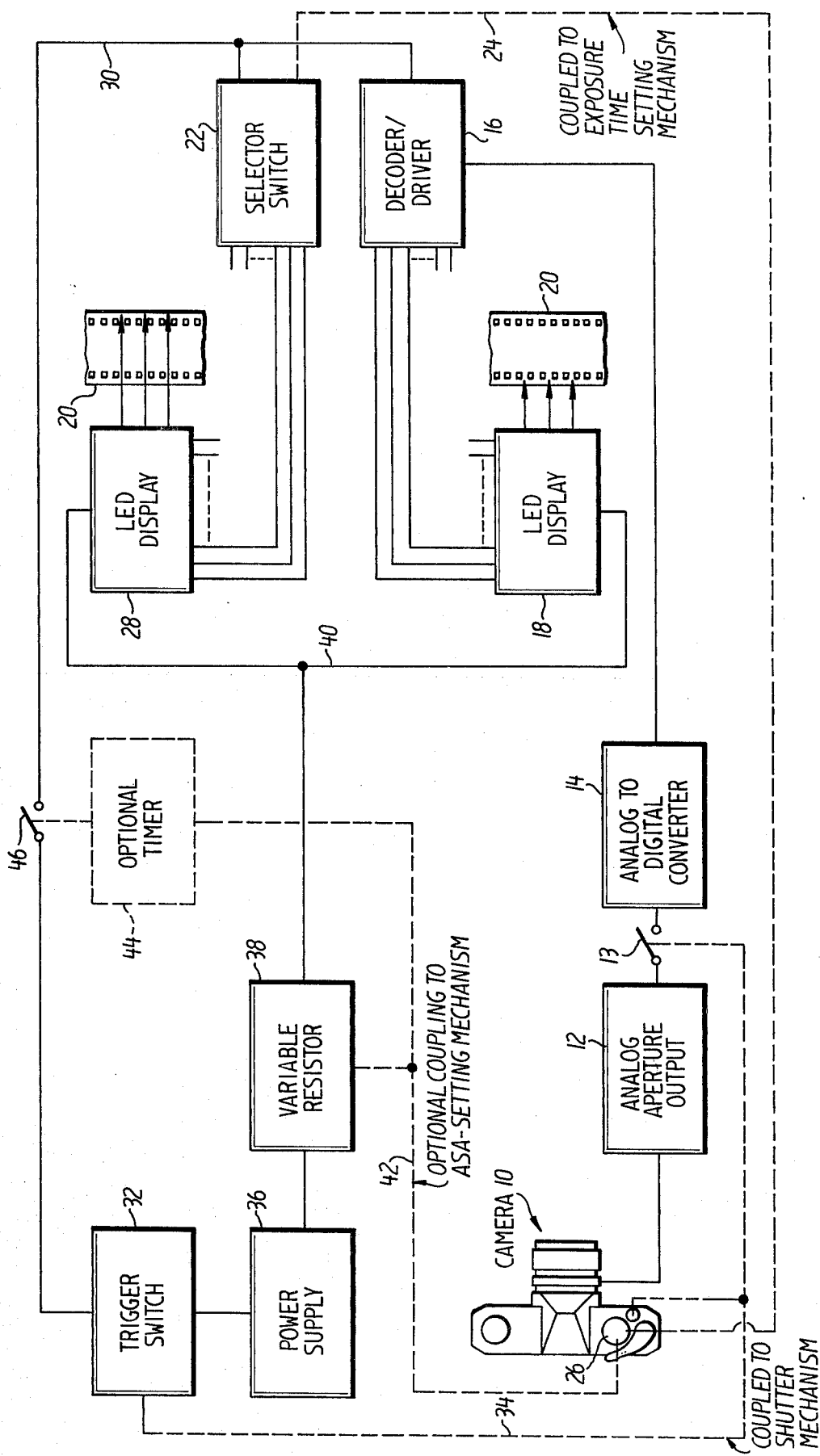

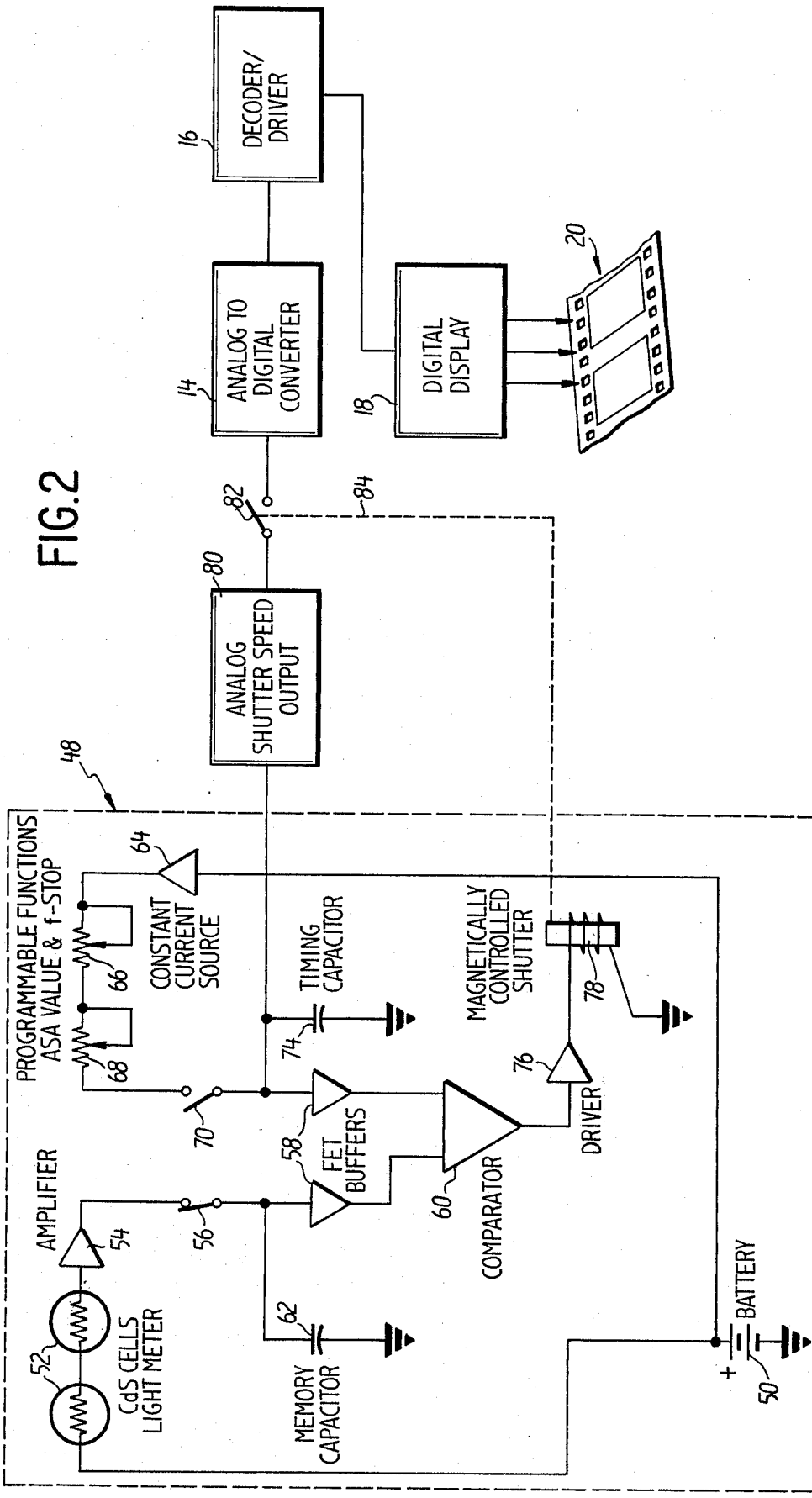

DATA RECORDING SYSTEM FOR AUTOMATIC CAMERAS

CROSS-REFERENCES TO RELATED APPLICATION

The present application includes improvements on the inventions disclosed in U.S. Pat. No. 3,843,956 issued Oct. 22, 1974 and in application Ser. No. 496,314 filed Aug. 9, 1974, and the disclosure of both is hereby incorporated by reference.

BACKGROUND OF THE INVENTION

1. Field of the Invention

The present invention relates to improvements to a system for photographically recording information on film, and more particularly to a system for recording the shutter speed and aperture settings of automatic cameras on photographic film.

2. Description of the Prior Art

In the photographic arts it is very often important to know precisely what shutter speed and aperture settings were used to produce a particular photograhic effect. With older cameras requiring manual aperture and shutter speed settings, obtaining this information was inconvenient, although not impossible, according to prior art techniques, simply by reading the indicated camera setting and manually writing down the observed settings.

However with the modern trend toward electronically controlled cameras, the task of recording aperture and shutter speed settings has become vitually impossible since, in many cases, the particular "setting" exist only for a brief instant in time and is identified only by a control voltage. In such instances, it is impossible to identify or permanently record the electronically developed settings which produce a particular photographic effect.

Some sophisticated electronic cameras include a readout for indicating the instantaneous aperture or shutter speed setting at the instant a photograph is to be taken. While such devices provide an indication of the settings in question, they provide no technique of recording the settings, and thus require memorization of the indicated settings and manual recording of them in substantially the same manner as with manually settable cameras. The difficulties in these recording techniques are set forth in more detail in my above referenced patent and application. Essentially, manual recording is very cumbersome, often results in many errors and often causes significant confusion in relating the recorded information with the corresponding negatives.

My previous patent and application describe methods and apparatus for automatically recording the camera setting information on film negatives so that no inconvenience is experienced and so that the possibility of error is eliminated. However, my previously described apparatuses were applicable only to manually settable equipment, creating a need for an improved apparatus to record the settings of automatic cameras.

SUMMARY OF THE INVENTION

Accordingly, one object of the present invention is to provide a novel system for recording the shutter speed and aperture settings of automatic cameras.

Another object of this invention is to provide a low cost and easily fabricated system adapted to be mounted to automatic cameras for recording aperture and shutter settings.

Yet another object of the present invention is the provision of a unique system which can be built into new automatic cameras as they are assembled or added to existing automatic cameras for permitting the recording of camera aperture and shutter speed settings directly on photographic film.

A still further object of the present invention is the provision of a novel electroluminescent display and control network for sensing and recording electronically determined settings of automatic cameras.

Another object of the invention is the provision of additional unique structural features which form a portion of a system for automatically recording shutter speed or aperture settings on photographic film.

Briefly, these and other objects of the invention are achieved by the provision of an electroluminescent display positioned adjacent to photographic film contained within an automatic camera. The electroluminescent displays are controlled by circuitry coupled to the camera electronics as well as to the manually settable parameters of the camera. In shutter priority cameras, circuitry is provided for sensing the electronic aperture control signal, converting the signal to digital form and subsequently driving the electroluminescent display. In aperture priority cameras similar circuitry is provided for sensing the shutter speed control signal, converting it to digital form and driving the appropriate electroluminescent display.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a block diagram illustrating the electronic components and mechanical linkages of one embodiment of one embodiment of the present invention; and, FIG. 2 is an electrical circuit and block diagram showing the electrical components of a second embodiment of the present invention illustrating the manner in which the system of the present invention may be coupled to the control circuitry of an automatic camera.

DESCRIPTION OF THE PREFERRED EMBODIMENTS

Referring now to the drawings, wherein like reference numerals designate identical or corresponding parts throughout the several views, and more particularly to FIG. 1 thereof, a block diagram is presented illustrating the innerconnection of electronic components and mechanical linkages included in one embodiment of the present invention.

More particularly, a conventional camera 10 is shown at the heart of the block diagram for providing all of the input and control information to the display and recording system of the present invention. The camera may be any of the modern electronic cameras, such as the Nikkormat EL, the Pentax ES, the Minolta XM or any other conventional electronic camera. Although the illustrated camera resembles a single lens reflex camera, the present invention is in no way limited to use with sophisticated single lens reflex cameras, and can also be used with Kodak pocket cameras, and other cameras of a similar nature having relatively simple lens and shutter systems.

The camera illustrated in FIG. 1 is understood to be a conventional electronic camera having a shutter priority control system, although cameras having aperture priority control systems will be discussed subsequently.

In shutter priority automatic cameras, the user manually selects shutter speed as priority, and the camera electronically selects the correct aperture. In less sophisticated cameras, the shutter speed may be fixed and the electronic control circuitry of the camera may simply select the appropriate aperture to meet lighting conditions. The actual cicuitry used in these systems is highly conventional and thus need not be described in detail. Generally, such cameras involve a light measuring network or light meter, the output of which is amplified and applied to an aperture control servo mchanism, thus providing analog exposure control.

Referring again to FIG. 1, a circuit for developing and briefly storing the analog aperture control signal of the camera 10, a conventional peak holding circuit for example, is represented as a block 12, the output of which is coupled through a shutter controlled switch 13 to a conventional analog-to-digital converter 14. The analog-to-digital converter converts the analog aperture control output signal into a digital equivalent signal which is applied to a decoder driver 16 for operating a light emitting diode display 18. The analog-to-digital converter 14 may, for example, be formed of two interconnected integrated circuits such as the LD 110 and LD 111 PMOS LSI circuits produced by Siliconix, Incorporated. These two interfacing chips provide a complete analog-to-digital converter utilizing a quantized feedback converting technique and are extremely compact and efficient, so that they are particularly suitable for use in the confined environment of a camera. The decoder driver 16 may be a conventional Fairchild model 9368 integrated circuit 7-segment driver combined with a conventional 7416 TTL hex inverter integrated circuit. The LED display 18 may then include a four digit display, each digit having seven LED segments. Alternatively, other displays, such as the LED or electroluminescent displays described in my above referenced patent and application may also be used in the system.

The physical arrangement of the LED display is described in greater detail in my above referenced patent and application and is designed to record the appropriate information from the camera 10, in this case the aperture setting information on the edge portion of a roll of photograhic film, illustrated schematically at 20. As explained in my previous patent and application, the information is photographically recorded in suitable coded form between the film sprocket holes and the edge of the film outside the area covered by the photograhic image or between the sprocket holes, between the sprocket holes and the image between the images or within the image zone, or elsewhere on the film. The information may be recorded on the film in many different forms, as explained in my previous patent and application, including coded markings or directly readable digital values.

The remaining system illustrated in FIG. 1 includes a selector switch 22 coupled through a suitable mechanism 24 to the exposure time or shutter speed setting mechanism 26 of the camera 10. The selector switch 22, which may be one of the types described in my previous patent and application, controls a second LED display 28 which may be identical to or different from the LED display 18, as explained in more detail in my above referenced patent and application. This display is similarly positioned adjacent the film strip 20, but preferably records information on the opposite edge of the film strip relative to the display 18. Both of the displays 18 and 28 are preferably positioned so that they record the camera setting information adjacent to the same photographic frame.

The selector switch 22 is coupled by means of a suitable conductive lead 30 to a trigger switch 32, which may be connected to the flash outlet of the camera or may simply be a small electrical contact arrangement coupled to the shutter trigger of the camera through a suitable mechanical coupling mechanism 34.

The trigger switch 32 opens or closes the circuit between a conventional power supply 36, such as a battery, and the lead 30, which is coupled to selector switch 22 and decoder driver 16, thereby controlling the application of power to the LED displays 18 and 28. A variable resistor 38 is coupled between the power supply 36 and a conductive lead 40 in the circuit of both LED displays. The variable resistor 38 may optionally be coupled by means of a suitable mechanism 42 to the ASA setting mechanism of the camera 10 whereby the brightness of the LED displays may be automatically adjusted as the camera is set to use films of different ASA ratings. This arrangement results in improved images being formed on the film by the LED displays. The mechanical linkage 42 may be omitted, in which case the variable resistor 38 may be manually adjusted for different films, or may be simply set to a desired level that is suitable for most popular films.

An optional timer 44 may also be coupled to the ASA setting mechanism of the camera 10 for driving an optional switch 46 in the conductive leads 30 for controlling the period during which LED displays 18 and 28 are energized. The timer 44 thus provides a further refinement in the operation of the LED displays and can be used to optimize the quality of the images recorded by the LED displays. The timer is useful since it serves to render the period during which the LED displays are energized independent of the period during which the trigger switch is activated. The timer itself may be a conventional electronic timing circuit, many types of which are well known to those skilled in the art. The timer may also be a mechanical or electrical arrangement coupled to the shutter mechanism of the camera so that the LED displays are energized only while the shutter is open.

The operation of the system illustrated in FIG. 1 will now be described in more detail. When the camera 10 is loaded with film, the ASA setting mechanism is conventionally set to the proper value, thereby adjusting the variable resistor 38 or the optional timer 44, if included and if coupled to the ASA setting mechanism. Alternatively the variable resistor 38 or timer 44 may be independently set to a selected value. The shutter speed is then manually set, thereby adjusting the selector switch 22 through the mechanical linkage 24. Simultaneously, the electronic equipment in the camera, conventionally including one or more light measuring cells, measures the ambient light falling on the camera. When the shutter control mechanism is partially depressed, the circuitry of the camera electronically sets the aperture in response to the measured light intensity, and the aperture setting output signal is thus fed to the output peaking circuit 12. When the shutter is triggered, the switch 13 is closed, applying the signal stored in the peaking circuit 12 to the analog-to-digital converter 14 and to the decoder driver 16. Thus as the camera exposure is made, the two LED displays 18 and 28 are energized, recording a code or numerical value on opposite edges of the film frame 20 indicating the precise shutter speed and aperture settings of the camera which resulted in a photographic image.

Although the apparatus illustrated in FIG. 1 is illustrated as a shutter priority system, it will be understood by those skilled in the art that the invention applies equally well to aperture priority systems. In an aperture priority system, it is merely necessary to couple the selector switch 22 mechanically to the aperture setting mechanism and to couple the electronic decoder driver 16 and the analog-to-digital converter 14 to the electronic shutter speed selecting circuitry of the camera.

To illustrate in more detail the coupling of the electronic circuitry of the present invention to that of the camera, reference is now directed to FIG. 2 showing at 48 a conventional circuit for automatic shutter speed control of the type used in aperture priority cameras. This conventional circuit includes a battery 50 coupled through a pair of CdS cells 52, forming the camera light meter, to an amplifier 54. The amplifier output is coupled through a first shutter controlled switch 56 to the input of a first FET buffer 58 which in turn feeds one input of a conventional comparator 60. A memory capacitor 62 is coupled to the input of the buffer 58 for storing a signal representive of the light level measured by the CdS cells 52.

The battery 50 is also coupled through a constant current source 64 to a pair of variable resistors 66 and 68 coupled in turn to the aperture setting and ASA setting mechanisms of the camera 10 to program these settings into the shutter speed control network. The output of these resistors passes through a second shutter control switch 70 and through a second FET buffer 58 to the second input of comparator 60. A timing capacitor 74 is coupled to the input of the buffer 58 to control the interval during which the shutter is to remain open. The output of the comparator 60 is applied through a driver 76 to a magnetic shutter actuator 78 for completing the shutter driving circuit.

The system of the present invention may be coupled to the illustrated camera circuit by taking the analog shutter speed output signal from the ungrounded side of the timing capacitor 74. The analog shutter speed output signal may, of course, be taken from other points in the camera circuitry, although the timing capacitor provides an ideal output. The analog shutter speed output signal is developed in a conventional peaking and holding circuit illustrated at block 80 (which may be substantially identical the circuit of block 12) and is then applied to the analog-to-digital converter 14 to be fed through the decoder driver 16 to the digital display 18 for recording the precise shutter speed of the camera.

The operation of the system illustrated in FIG. 2 will now be described in more detail. When the shutter of a camera containing the illustrated circuit is pressed, the switch 56 is first closed, so that the memory capacitor 62 is charged through the CdS cells to a precise voltage that depends upon subject lighting. This stored voltage is fed to comparator 60 through buffer 58 which may in practice comprise a single field effect transistor. As the shutter switch is further depressed, the switch 56 is opened and the switch 70 is closed, opening the camera shutter. The shutter timing capacitor 74 then begins its charging cycle, under the influence of the externally chosen programmable resistive functions represented by resistors 66 and 68. When the voltage level of timing capacitor 74 equals that of memory capacitor 62, the capcitor indicates an equality of signals and the shutter is closed by the magnetic actuator 78. The peak detector circuit 80 stores the peak voltage on capcitor 74 which represents the shutter speed in analog form. When the shutter is closed by the magnetic actuator 78, a switch 82 is closed via mechanical linkage 84, whereby the voltage representing the shutter speed is applied to analog-to-digital converter 14 for recording on film 20.

Although the above described circuit is illustrated in the context of an aperture control network, it will be apparent to those skilled in the art that a substantially identical circuit can be coupled to a shutter priority type circuit. Thus the present invention is not in any way limited to use with either shutter or aperture priority system, but can be equally well used with both. Furthermore, the present invention can be used with systems having only electronic shutter speed or electronic aperture controls, or with systems having both electronic shutter and aperture control circuits, as will be apparent to those skilled in the art.

The preferred embodiment of the present invention utilizes light emitting diode displays as the light source for imprinting information on photographic film. These LED displays may be seven segment displays, stencilled number displays or coded dot displays, all of which are described in more detail in my above referenced patent and application. It is also noted in my above referenced application that the quality of light emitting diode displays may be improved by various techniques. A further technique for improving the quality of these light emitting diodes to provide small slits adjacent the light emitting service of the diodes. This greatly enhances the uniformity of the output light and provides a substantially better image on photographic film. It is further pointed out that diodes emitting red light are most effective in the apparatus of the present invention, particularly when used in conjunction with color film. Red light emitting diodes result in the printing of red numbers which are not easily confusable with the various processing and handling numbers imprinted on the edge portions of the film by the processor, since these additional numbers are printed in other colors. Furthermore, most color films appear to be highly sensitive to the red light emitted by LEDS.

Many types of mechanical switches and mechanical coupling features may be used to couple the selector switches and variable resistors of the present invention to conventional cameras. Some of these are described in my above-identified patent and application. Further modifications of these systems include ring type arrangements having electrical wipers that can be placed on the normally round knobs conventionally used for shutter speed selection. Many other similar variations are possible within the scope of the teachings of the present application. Seven-bar indicator and binary code switches of the type produced by EECo. (Electronic Engineering Company of California) may also be used with the system of the present invention, as these switches are particularly compact and are easily adaptable to the confined spaces available in cameras. Furthermore, conventional shutter trigger mechanism can be easily modified to include the switching contacts necessary to actuate the apparatus of the present invention. Thus it is not necessary to couple the apparatus of the present invention to the flash output of a camera. Accordingly, conventional flash attachments can be used while the apparatus of the present invention is coupled to a camera simply by operating the present apparatus from the shutter trigger of the camera.

The mechanical linkage and electronic equipment of the present invention is extremely compact and can be fitted to cameras after they are assembled, so that the apparatus can be distributed in kit form for modification of existing cameras. Naturally, the apparatus can also easily be installed in new cameras as they are being assembled.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A system for recording on photographic film electronically controlled exposure settings of an automatic camera comprising:
   circuit means adapted to be coupled to the exposure control electronic circuitry of said camera for obtaining analog control signals representing said electronically controlled exposure settings;
   analog-to-digital converter means coupled to said circuit means for converting said analog signals to digital form;
   decoder means coupled to said analog-to-digital converter means for decoding the output thereof; and,
   first recording means adapted to be positioned adjacent an edge portion of said photographic film within said camera, said first recording means including first electroluminescent display means coupled to said decoder means for recording on the edge portion of said film in a predetermined code said electronically controlled camera exposure settings.

2. A system as in claim 1, further comprising:
   selector switch means adapted to be coupled to a manually controlled exposure setting mechanism of said camera for identifying selected settings of said setting mechanism; and,
   second recording means adapted to be positioned adjacent an edge portion of said film, said second recording means including second electroluminescent display means coupled to said selector switch means for recording on the edge portion of said film in a predetermined code said manually controlled camera exposure settings.

3. A system as in claim 2, further comprising:
   a power supply; and,
   a trigger switch for controlling said first and second recording means.

4. A system as in claim 1, further comprising:
   timing means coupled to said recording means for controlling the interval during which said electroluminescent display is energized.

5. A system as in claim 1, further comprising:
   variable resistor means coupled to said first recording means for controlling the intensity of said electroluminescent display means.

6. A system as in claim 5, further comprising:
   mechanical means for coupling said variable resistor means to a manually controlled setting mechanism of said camera.

7. A system as in claim 1, wherein:
   said display means comprises a plurality of light emitting diodes.

8. A system as in claim 7, wherein:
   said light emitting diodes emit red light.

9. A system as in claim 4, further comprising:
   mechanical means for coupling said timing means to a manually controlled setting mechanism of said camera.

* * * * *